United States Patent

[11] 3,595,551

| [72] | Inventor | Johannes Ortheil<br>Anrath, Germany |
|---|---|---|
| [21] | Appl. No. | 818,630 |
| [22] | Filed | Apr. 23, 1969 |
| [45] | Patented | July 27, 1971 |
| [73] | Assignee | Langen & Co.<br>Dusseldorf, Germany |
| [32] | Priority | May 14, 1968 |
| [33] | | Germany |
| [31] | | P 17 55 478.8 |

[54] RESILIENT SUSPENSION SYSTEM FOR VEHICLES ADAPTED TO BE ARRANGED BETWEEN THE WHEEL SUPPORTING MEANS AND THE VEHICLE BODY FOR BALANCING THE HEIGHT OF THE VEHICLE BODY INDEPENDENTLY OF LOAD VARIATIONS ON THE VEHICLE
4 Claims, 2 Drawing Figs.

| [52] | U.S. Cl. | 267/64, 267/34 |
|---|---|---|
| [51] | Int. Cl. | F16f 3/07 |
| [50] | Field of Search | 267/64 V, 64 AV, 65 V, 34 V |

[56] References Cited
UNITED STATES PATENTS

| 2,324,590 | 11/1955 | Irwin | 267/64 |
| 3,480,269 | 11/1969 | Jewell et al. | 267/64 |

*Primary Examiner*—James B. Marbert
*Attorney*—Holman & Stern

ABSTRACT: A resilient suspension system for vehicles adapted to be arranged between the wheel-supporting means and the vehicle body for balancing or adjusting the height of the vehicle body independently of load variations on the vehicle in which there is provided a cylinder member, a piston member and a piston rod defining member, with said members coacting to provide pressure, storage, and pumping spaces respectively, one of said members being secured to the vehicle body and another of said members being secured to the wheel-supporting means and spring means being biased between the member coacting to provide the pressure space and the member connected with the wheel-supporting means.

INVENTOR
JOHANNES ORTHEIL

RESILIENT SUSPENSION SYSTEM FOR VEHICLES ADAPTED TO BE ARRANGED BETWEEN THE WHEEL SUPPORTING MEANS AND THE VEHICLE BODY FOR BALANCING THE HEIGHT OF THE VEHICLE BODY INDEPENDENTLY OF LOAD VARIATIONS ON THE VEHICLE

BACKGROUND OF THE INVENTION

The present invention relates to a resilient suspension system for vehicles adapted to be arranged between the wheel-supporting means and the vehicle body including automatic means for stabilizing or balancing the height of the vehicle body independent of load variation on the vehicle.

Such resilient suspension systems operate generally with level-regulating valves and pressure-generating means located exteriorly of the device. Hence such arrangements necessitate additional installation space which is not always available in smaller vehicles particularly with regard to the subsequent installation thereof. Moreover, a pressure generator must be present in the vehicle.

SUMMARY OF THE INVENTION

It is a salient object of this invention to provide a resilient suspension system of the above-mentioned type which requires little space and which maintains the height of the vehicle constant independently of an outside pressure generator and without the necessity of employing level-regulating valves as well as being independent of changes in load.

Broadly, the problem existing in the art is solved by the present invention by the combination of the following components:

A cylinder member, a piston member, and a piston rod defining member mounted within the cylinder member for liquidtight relative movement, with such members coacting to provide a pressure space between the cylinder member and the piston member, and a storage space between the piston member and the piston rod defining member, a stem having an axially extending bore passes through the piston member and projects into a bore in the piston rod defining member thereby providing a pumping space, the pumping space is connected via suitable means with the storage space and further means with the axially extending bore with a liquid cushion in the pressure space and a further bore connects the pressure space with the storage space when a level position is attained.

By virtue of the present invention there is realized a self-pumping oleo strut which utilizes the resilient movements of a wheel or a wheel-supporting means for pumping the vehicles into its level position.

Further object and advantages of the invention will become more readily apparent to persons skilled in the art from the following detailed description and annexed drawings and in which drawings:

DETAILED DESCRIPTION OF THE INVENTION

Figure 1:
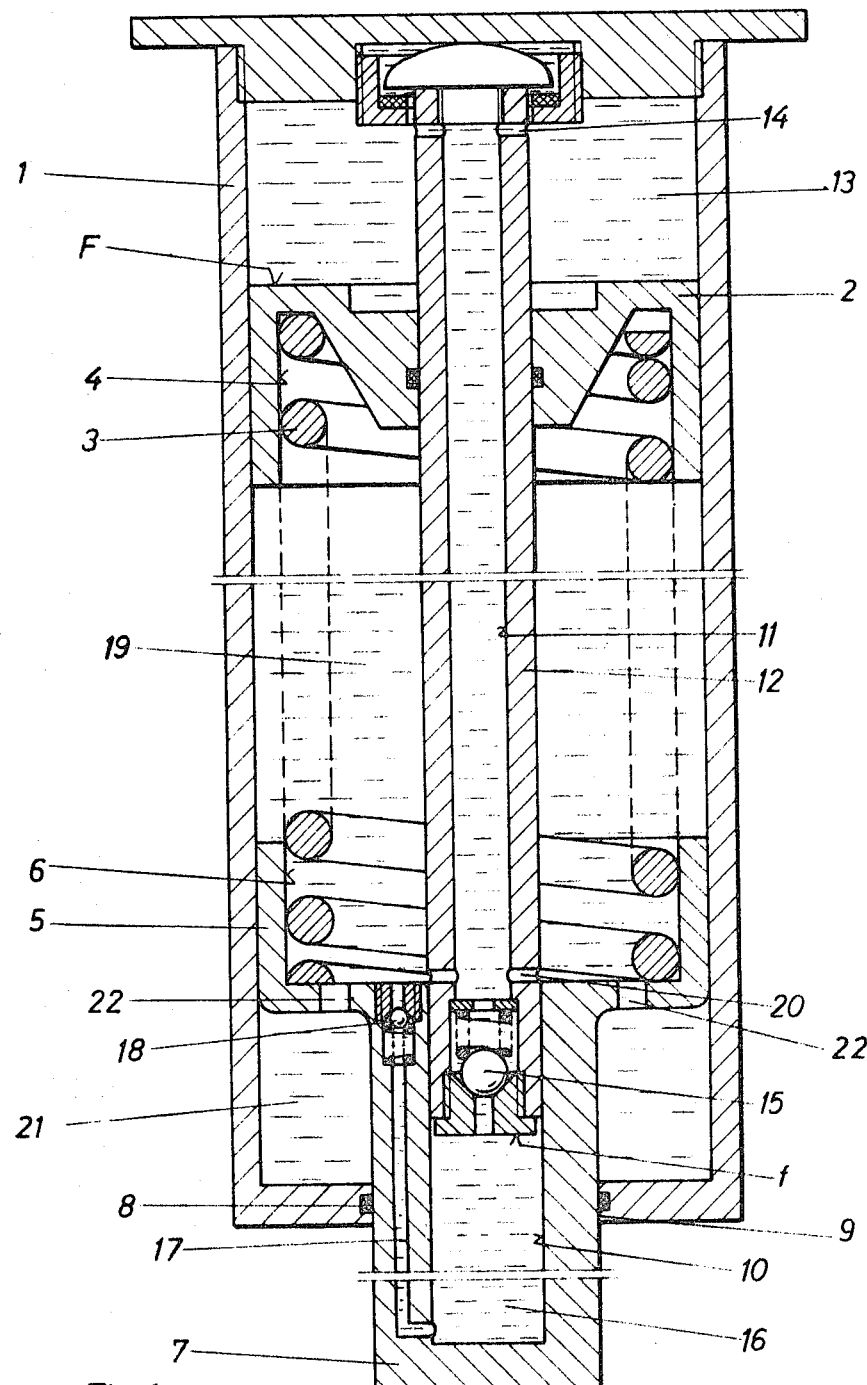
FIG. 1 is a view in axial cross section of a spring suspension system in which a compression spring is located beneath a cylinder.

Referring to the drawings and more particularly FIG. 1, there is illustrated a cylinder 1 in which a piston 2 is mounted for sliding or reciprocating movement in a liquidtight manner. It will be noted that the piston 2 is substantially cup shaped and is provided with a depression 4. A resilient cup-shaped member 5 is located within the cylinder 1 in axially spaced relationship to the piston 2 for sliding or reciprocating movement in a liquidtight manner within the cylinder and is provided with a depression 6. The piston 2 and the cup-shaped member 5 constitute abutments for a coil compression spring 3 and it will be noted that the depressions 4 and 6 serve for guiding the spring 3.

The cup-shaped member 5 is rigidly connected with a piston rod 7 having a longitudinally extending bore 10. The piston rod 7 is guided in a bore 9 of one end wall of the cylinder 1 and is sealed by means of a low-pressure gasket 8. It will further be noted that a rod or stem 12 having a central longitudinally extending bore 11 enters the bore 10 of the piston rod and the stem 12 passes tightly through an opening formed in the piston 2 with its free end being secured to the end wall of the cylinder 1 opposite the piston rod 7.

In the area of the attachment of the stem 12 to the end of the cylinder, it will be noted that the stem is provided with a transverse bore 14 which constitutes a path of communication between a pressure space 13 bounded by the piston 2, the stem 12 and the end wall of the cylinder and bore 11. At the opposite end of the stem 12 there is located a relief valve 15 which opens in the direction of the pressure space 13.

A pumping space 16 is defined by the end of the stem 12 and the bore 10 and such pumping space is connected via a bore 17 with a storage space 19 located between the piston 2 and the cuplike body 5. A relief valve 18 which opens in the direction of the pumping chamber 16 is provided for the bore 17 adjacent the space 19.

It will further be observed that the stem 12 is formed with a transverse bore 20 substantially in the zone of the cuplike body 5 and since the diameter of the piston rod 7 is less than the inside diameter of the cylinder 1 there is provided an annular space 21 which is bounded axially by the cylinder 1 and the base of the cuplike body 5. The cuplike body 5 has bores 22 formed therein for connecting the annular space 21 with the storage space 19.

While the operation of the resilient suspension system is believed to be readily apparent from the above description, it may be summarized as follows:

Referring to FIG. 1 and starting from the position of the piston 2 and the cuplike body 5 illustrated therein, liquid will flow from the pressure space 13 via the transverse bore 14, axial bore 11, and transverse bore 20 into the storage space 19. This backflow effects, provided there is a constant vehicle speed, the retraction of the piston 2 and cuplike body 5 or piston rod 7 as long as the cuplike body 5 closes the transverse bore 20. The volume of the pumping space 16 likewise decreases.

Due to the substantially smaller area $f$ of the bore 10 as compared to the effective area $F$ of the piston 2, a higher pressure being pumped naturally the retraction of the piston rod 7 results in the distance between the wheel-supporting means or axle and the vehicle body being shortened. As long as the vehicle is only stressed statically, the distance cannot be again brought to the desired value. This only is possible under a dynamic stress in which the wheels or the wheel-supporting means execute retracting and extending movements. The stem 12 thus moves relative to the piston rod 7 and the pumping space 16 increases during the extension and diminishes during the retraction of the springs. When the pumping space 16 increases, an underpressure is produced which effects the opening of the release valve. Due to the pressure gradient from the storage space 19 to the pumping space 16, the liquid flows into the pumping space 16. During the subsequent retraction movement of the spring, the pumping space 16 again increases and liquid is forced, as above described, into the pressure space 13. Since the volume of the pressure space 13 is thereby reduced, the piston 2 and via spring 13 also the cuplike body 5 are so far displaced until the cuplike body 5 again exposes or opens the transverse bore 20.

In the event of a reduction of the load, the spring 3 expands in a corresponding manner.

The cuplike body 5 is displaced until the transverse bore 20 is open and the pressure space 13 again decreases. Preferably, the air cushion will be maintained under a certain overpressure over the storage space 19 or it will be connected with the atmosphere for facilitating the intake into the pumping space 16.

Figure 2:
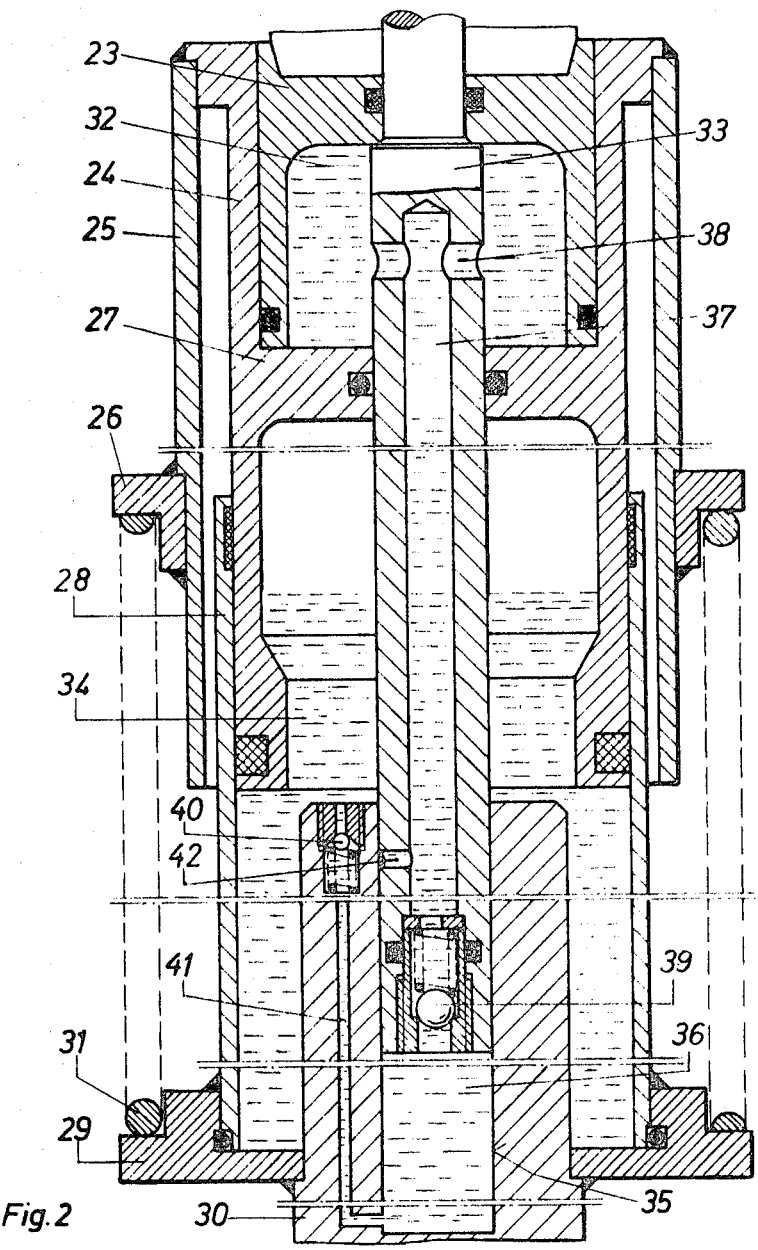
FIG. 2 is a view similar to FIG. 1 of a further embodiment utilizing an exteriorly disposed compression spring.

With reference to the embodiment illustrated in FIG. 2, it will be noted that a piston 23 is rigidly connected with a vehicle body or chassis (not shown). A cylinder 24 moves in a liquidtight manner on the piston 23 and the cylinder is surrounded by a pipe or conduit 25 secured thereon. A resilient abutment 26 is welded to the pipe 25. The cylinder 24 is subdivided in an axial direction by means of a web 27 and a further cylinder 28 whose movable arm the cylinder 24. The cylinder 28 is rigidly and tightly connected with a piston rod 30 by means of a resilient collar or ring 29. A compression spring 31 is biased between the abutment 26 and a collar or ring 29.

A pressure space 32 is located between the piston 23 and the cylinder 24. A stem 33 is tightly secured to the piston 23 and extends axially through the pressure space 32 as well as the web 27 and a suitable packing is provided between the web and the stem 33. In addition, the stem 33 passes through a storage space 34 defined by the cylinders 24 and 28 and enters a bore 35 of the piston rod 30 providing a pumping chamber 36 between the end of the stem and the bore 35.

The stem 33 is formed with an axially extending bore 37 which, via a transverse bore 38 communicates with the pressure space 32. A relief valve 39 is arranged in the bore 37 to permit the flow from the pumping space 36 into the pressure space 32 and blocks or arrests the flow in the opposite direction. A relief valve 40 in the piston rod 30 connects the storage space 34 via a bore 41 with the pumping space 36. A transverse bore 42 which serves as an overflow bore connects the bore with the storage space 34 when the desired level of the vehicle is attained and is covered by the piston rod 30 below the level position.

The method of operation of the assemblage illustrated in FIG. 2 is substantially the same as that described in connection with FIG. 1.

The invention is not restricted to the specific embodiments illustrated and in particular the mutual arrangement of the pistons and cylinders can be varied in numerous ways since one part can basically move in or on another part.

I claim:

1. A resilient suspension system for vehicles adapted to be arranged between wheel-supporting means and a vehicle body for automatically balancing the height of the vehicle, comprising a cylinder member, a piston member, and a piston rod defining member mounted within the cylinder member for liquidtight relative movement, said members coacting to provide a pressure space between the cylinder member and the piston member and a storage space between the piston member and the piston rod defining member, one of said members being fixed and secured to the vehicle body and a second of said members being movable and connected to the wheel-supporting means, a stem secured to the fixed member and provided with an axially extending bore, said stem passing through the piston member and projecting into a bore provided in the piston rod defining member for defining therewith a pumping space, means providing a communication path between said pumping space and said storage space, a relief valve for said communication path defining means, further means providing a communication path between said pumping space, the axially extending bore in the stem and the storage space, a relief valve in said last name communication defining means, further means for providing communication between the axially extending bore in the stem and said pressure space, an overflow bore connecting said pressure space with said storage space via the axial extending bore in the stem when the level position is reached and a coil spring biased between the member coacting to provide the pressure space and the member connected with the wheel-supporting means.

2. The resilient suspension system for vehicles as claimed in claim 1 in which said stem is mounted on the fixed member with limited play.

3. The resilient suspension system as claimed in claim 1 in which each of said fixed and movable members is provided with a flange directed axially thereof, with the flange having a length greater than the block length of the springs.

4. The resilient suspension system as claimed in claim 1 in which the diameter of the movable member is greater than the diameter of the piston rod whereby an annular space is provided with such annular space being in communication with the storage space by ducts provided in the movable member.